United States Patent
Larramendy et al.

[11] Patent Number: 5,995,880
[45] Date of Patent: *Nov. 30, 1999

[54] METHOD AND DEVICE FOR DETECTING VERTICAL GUSTS OF WIND AND APPLICATION THEREOF TO THE PITCH-ATTITUDE CONTROL OF AN AIRCRAFT

[75] Inventors: Panxika Larramendy, Toulouse; Daniel Delgado, Plaisance du Touch, both of France

[73] Assignee: Aerospatiale Societe Nationale Industrielle, Paris, France

[*] Notice: This patent is subject to a terminal disclaimer.

[21] Appl. No.: 08/977,016

[22] Filed: Nov. 24, 1997

[30] Foreign Application Priority Data

Dec. 2, 1996 [FR] France ................... 96 14736

[51] Int. Cl.⁶ .................. G06F 7/70; G05D 1/08
[52] U.S. Cl. ............... 701/4; 701/3; 701/5; 701/8; 244/181; 244/182; 244/76 R
[58] Field of Search ..................... 701/4, 3, 5, 8, 701/10, 14; 244/17.21, 17.13, 76 R, 177, 181, 182, 178, 192, 194, 195, 34 A, 48, 75 R, 90 A; 73/178 T; 340/967, 968, 971, 972; 318/563, 580

[56] References Cited

U.S. PATENT DOCUMENTS

| | | |
|---|---|---|
| 3,814,912 | 6/1974 | Manke et al. ................... 701/6 |
| 4,043,526 | 8/1977 | Donley et al. .................. 244/194 |
| 4,092,716 | 5/1978 | Berg et al. ....................... 701/3 |
| 4,314,341 | 2/1982 | Kivela ............................. 701/16 |
| 4,937,571 | 6/1990 | Bonafe ........................... 340/968 |
| 4,967,363 | 10/1990 | Bonafe ........................... 701/15 |
| 5,127,608 | 7/1992 | Farineau et al. ................. 701/3 |
| 5,365,446 | 11/1994 | Farineau et al. ................. 701/3 |

OTHER PUBLICATIONS

"Optimal Guidance during a Windshear Encounter" Scientific Honeyweller, vol. 10, No. 1, Minneapolis pp. 110–116, Jan. 1989.

*Primary Examiner*—Jacques H. Louis-Jacques
*Attorney, Agent, or Firm*—Marshall, O'Toole, Gerstein, Murray & Borun

[57] ABSTRACT

An apparatus and method for detecting vertical gusts of wind on board an aircraft in cruising flight is disclosed. The method includes the steps of: calculating an absolute value ($|\dot{\alpha}-\dot{\theta}|$) of a difference between a pair of first differentials with respect to time ($\dot{\alpha}$ and $\dot{\theta}$) of a current incidence $\alpha$ and a current pitch attitude $\theta$ of the aircraft, comparing the absolute value to an upper threshold (Ss), comparing a current Mach number (M) of the aircraft to a Mach number threshold (Mo), and generating an electrical signal that represents presence of a vertical gust of wind when the absolute value is above the upper threshold, when the current Mach number is above the Mach number threshold, and when aerodynamic flaps and slats of the aircraft are in a clean configuration.

13 Claims, 3 Drawing Sheets

METHOD AND DEVICE FOR DETECTING VERTICAL GUSTS OF WIND AND APPLICATION THEREOF TO THE PITCH-ATTITUDE CONTROL OF AN AIRCRAFT

BACKGROUND OF THE INVENTION

The present invention relates to a method for detecting vertical gusts of wind on board an aircraft in cruising flight and to a detection device employing said method and the application of both to the control of said aircraft. The vertical gusts of wind to which the present invention relates are swirling turbulence (rather than high-frequency turbulence that causes vibration), generated by swirling rollers of the vortex type, which subject the aircraft passing through or close to them to an upward (or downward) gust of wind then to a downward (or upward) gust of wind that lasts for a few seconds, or alternatively, to a succession of upward and downward gusts of wind if there are a number of vortices.

If the aircraft is on manual control in the cruising flight and encounters an upward gust of wind of this kind, it is subjected, first of all, to a high positive load factor which means that the pilot reacts with a nose-down command on the aircraft, in order to counter the upward wind effect. However, the gust then changes direction and the wind becomes a downward gust, which means that the pilot's nose-down action is now adding to the downward gust of wind to apply a negative load factor on the aircraft, which load factor is even higher than the load factor that would be the result of the gust itself. This may then cause injury to passengers and damage to the aircraft.

The same thing happens if the aircraft has an automatic pilot and if this automatic pilot is engaged during the cruising flight at the time when the upward gust of wind is encountered.

What happens is that this gust of wind causes the automatic pilot to disengage and a switch to manual control, either automatically by the action of protection devices (for example angle of incidence protection) or through an instinctive action by the pilot on the stick. There too, the pilot's nose-down action will add to the reverse gust of wind.

Of course, what was applied hereinabove is applicable mutatis mutandis to instances where a gust of wind which starts out downward then switches upward is encountered.

Thus, from the foregoing, it will be readily understood that in general, any control action to counter a gust of wind produces its effect at the moment said gust changes direction, which means that this control action unfavorably increases the already high load factor to which said gust is subjecting the aircraft.

SUMMARY OF THE INVENTION

The object of the present invention is to overcome this drawback and to improve the behavior and control of an aircraft in the presence of vertical gusts of wind. To achieve this, according to the present invention, as will be seen below, use is made of an electrical signal that represents a gust of this kind. Thus, in accordance with the present invention, the first step is to generate such a signal.

To this end, according to the invention, to detect vertical gusts of wind on board an aircraft in cruising flight, use is made of a method which is noteworthy in that:

the absolute value of the difference between the first differentials with respect to time of the current incidence and the current pitch attitude of the aircraft is calculated;

said absolute value is compared to an upper threshold;

the current Mach number of said aircraft is compared to a Mach number threshold; and an electrical signal that represents the presence of a vertical gust of wind is generated when simultaneously:
said absolute value is above said upper threshold;
said current Mach number is above said Mach number threshold; and
the aerodynamic flaps and slats of said aircraft are in clean configuration.

This then yields a particularly simple method of detecting gusts, involving only parameters that are available on board an aircraft, namely the incidence, the pitch attitude, the Mach number and the position of the aerodynamic flaps and slats.

In order not to detect instantaneous winds that do not represent gusts, and especially measurement noise, it is advantageous for said absolute value to be filtered before it is compared with said upper threshold. The latter, according to another specific feature of the present invention, may be chosen to be at least approximately equal to 1 degree angle per second.

Likewise, to avoid untimely generation of said electrical signal that represents the presence of a vertical gust of wind, this generation is advantageously subordinated to the fact that said absolute value is above said upper threshold for at least a first determined duration. This first determined duration may have a value of the order of 200 ms.

As a preference, in order to have information regarding the end of a gust, said absolute value is additionally compared to a lower threshold, which is below said upper threshold and which corresponds for certain to an absence of gust. A lower threshold of this kind may be at least approximately equal to 0.5 degree angle per second.

Furthermore, to avoid said electrical signal that represents the presence of a gust disappearing immediately as soon as said absolute value becomes equal (as it decreases) to said upper threshold, provision is made that, when said absolute value changes from a value above to a value below said upper threshold, said signal that represents the presence of a vertical gust of wind is sustained until said absolute value drops below said lower threshold so long as:

said current Mach number is above said Mach number threshold; and the aerodynamic flaps and slats of said aircraft are in clean configuration.

Thus, a confirmation of the end of the gust is obtained.

Moreover, in order for this to be a stronger confirmation, the sustaining of said electrical signal that represents the presence of vertical gusts of wind is subordinated to the fact that said absolute value is below said lower threshold for at least a second predetermined duration.

A second predetermined duration of this kind may be of the order of 1 second.

The present invention relates more particularly to a device for detecting vertical gusts of wind on board an aircraft in cruising flight, employing the method specified hereinabove and noteworthy in that it comprises:

subtracting means receiving the first differential with respect to time of the current incidence and the first differential with respect to time of the current pitch attitude and delivering on their output the absolute value of the difference between said differentials;

first comparison means for comparing said absolute value with an upper threshold and for delivering a signal if said absolute value is above said upper threshold;

second comparison means for comparing the current Mach number of the aircraft with a Mach number threshold and for delivering a signal if said current Mach number is above said Mach number threshold; and first logic means of the AND type receiving, respectively, on their inputs:

said signal resulting from the comparison of said absolute value with said upper threshold;

said signal resulting from the comparison of said current Mach number with said Mach number threshold; and a signal that represents the fact that the aerodynamic flaps and slats of said aircraft are in clean configuration, said first logic means delivering on their output a signal that represents the presence of vertical gusts of wind.

As a preference, said device makes use of current incidence and current pitch attitude measurements available on board the aircraft, which means it comprises differentiating means receiving signals that represent the current pitch attitude and the current incidence and delivering on their output said first differentials.

Advantageously, the device additionally comprises:

third comparison means for comparing said absolute value with a threshold below said upper threshold and for delivering a signal if said absolute value is below said lower threshold; and second logic means inserted between said first comparison means and said first logic means, said second logic means receiving on their inputs said signals resulting from the comparisons of said absolute value with said thresholds and delivering to said first logic means:

either no signal, if said signal resulting from the comparison of said absolute value with said lower threshold exists;

or said signal resulting from the comparison of said absolute value with said upper threshold, as long as said absolute value is above said lower threshold.

Thus, according to the present invention, it is possible to produce a device for detecting vertical gusts of wind. As was mentioned earlier, one of the prime objectives of such a detection device is to allow the pitch-attitude control of an aircraft to be improved, especially to avoid the control actions combining with said gusts to subject the aircraft to excessive load factors.

To this end, according to another aspect of the present invention, a device for controlling the pitch attitude of an aircraft, comprising a stick system available to the pilot and a pitch-attitude flight control system receiving pitch-attitude control commands from said stick system and generating the pitch-attitude control commands for the aerodynamic pitch-attitude control surfaces, is noteworthy in that it comprises:

an auxiliary flight-control system receiving said pitch-attitude control commands from said stick system and generating pitch-attitude control commands which are limited at least as far as commands to nose-down are concerned;

a controlled switch located between said control systems on the one hand, and said aerodynamic pitch-attitude control surfaces on the other hand, and which can send to these control surfaces either the pitch-attitude control commands from said flight-control system, or the pitch-attitude control commands from said auxiliary flight-control system; and a device for detecting vertical gusts of wind controlling said controlled switch so that said limited pitch-attitude control commands are sent to said aerodynamic surfaces during such vertical gusts of wind.

Thus, during gusts, deliberate pitch-attitude control commands from the pilot are limited, which avoids the aforementioned drawbacks.

DESCRIPTION OF THE DRAWINGS

The figures of the appended drawing will make it easier to understand how the invention can be achieved. In these figures, identical references denote similar elements.

DETAILED DESCRIPTION OF THE PREFERRED EMBODIMENTS

Figure 1:
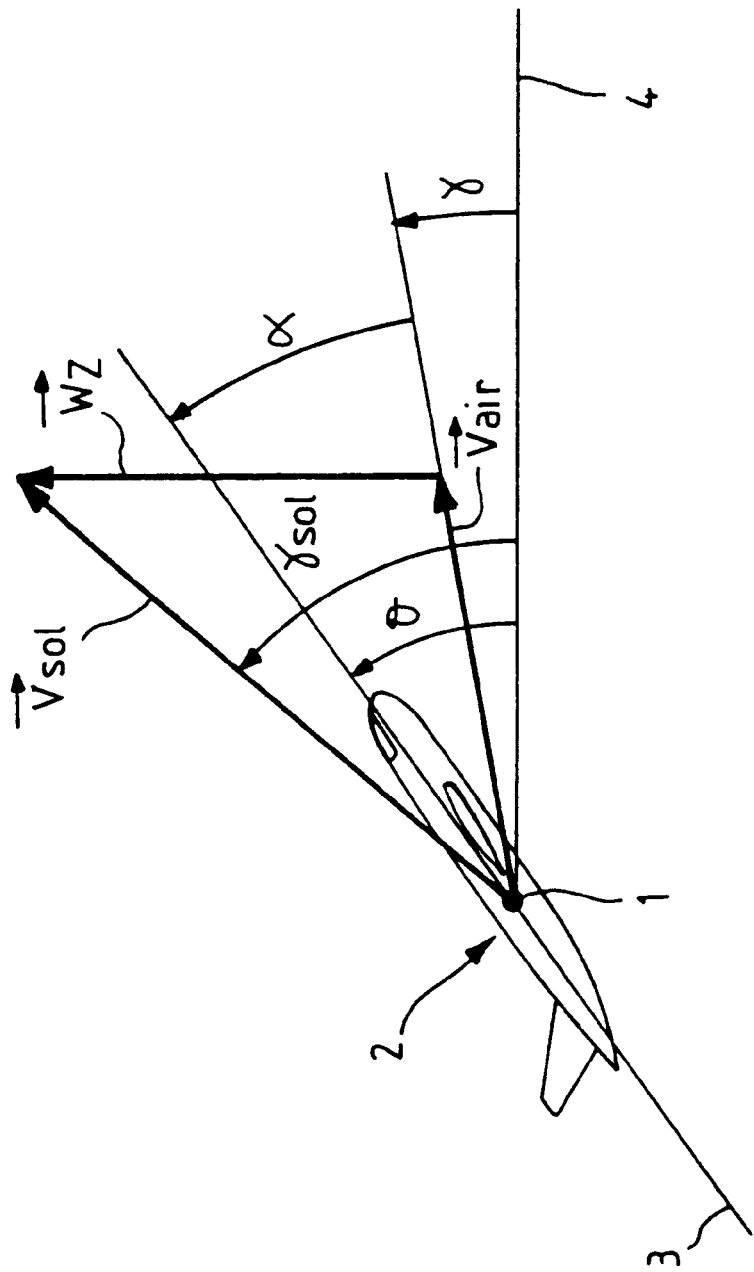
FIG. 1 is a diagram of the speeds of an airplane in flight.

Depicted in FIG. 1 is a diagram of the speeds applied to the center of gravity 1 of an airplane 2 in climbing flight, encountering an upward vertical gust of wind. In this FIG. 1, the longitudinal axis 3 of the airplane 2 is inclined by the pitch attitude $\theta$ with respect to the line of the horizon 4 and has the incidence $\alpha$ with respect to the aerodynamic speed $\vec{Vair}$ which, itself, is inclined by the aerodynamic slope $\gamma$ with respect to said horizon line 4. The speed $\vec{Wz}$ of the upward vertical wind combines with said speed $\vec{Vair}$ to form the speed $\vec{Vsol}$ of said airplane 2 with respect to the ground, this speed $\vec{Vsol}$ being inclined by the slope $\gamma sol$ with respect to the horizon line 4.

It can readily be seen that: $\gamma sol = \gamma + (Wz)/Vair$, if the lengths of the vectors $\vec{Wz}$ and $\vec{Vair}$ are called Wz and Vair respectively.

Incidentally, $\gamma = \theta - \alpha$, which means that $$\gamma sol = \theta - \alpha + (Wz)/Vair.$$

Given, as explained hereinabove, that the objective according to the invention is to improve the behavior of the airplane in cruising flight, it is possible to dispense with measuring $\gamma sol$ and consider that the latter is zero. Thus, $$(Wz)/Vair = \alpha - \theta$$

If we consider instantaneous variations in wind $\delta/\delta t(Wz/Vair)$, it can be seen that with the above assumption, these variations are equal to $\dot{\alpha} - \dot{\theta}$, which represents the difference between the first differentials with respect to time of the current incidence $\alpha$ and of the current pitch attitude $\theta$ of the airplane 2.

In accordance with the present invention, the instantaneous variations in wind are therefore determined by measuring said difference $\dot{\alpha} - \dot{\theta}$. In order to be able to detect both positive (upward) and negative (downward) variations in instantaneous wind, what is actually measured is the absolute value $|\dot{\alpha} - \dot{\theta}|$ of said difference and this is compared to a gust detection threshold Ss. Such a threshold Ss is expressed in degrees angle per second and may, for example, be at least approximately equal to 1°/s.

Thus, if $|\dot{\alpha}-\dot{\theta}|$ is above Ss, it is considered that the airplane 2 is subjected to a vertical gust of wind.

Figure 2:
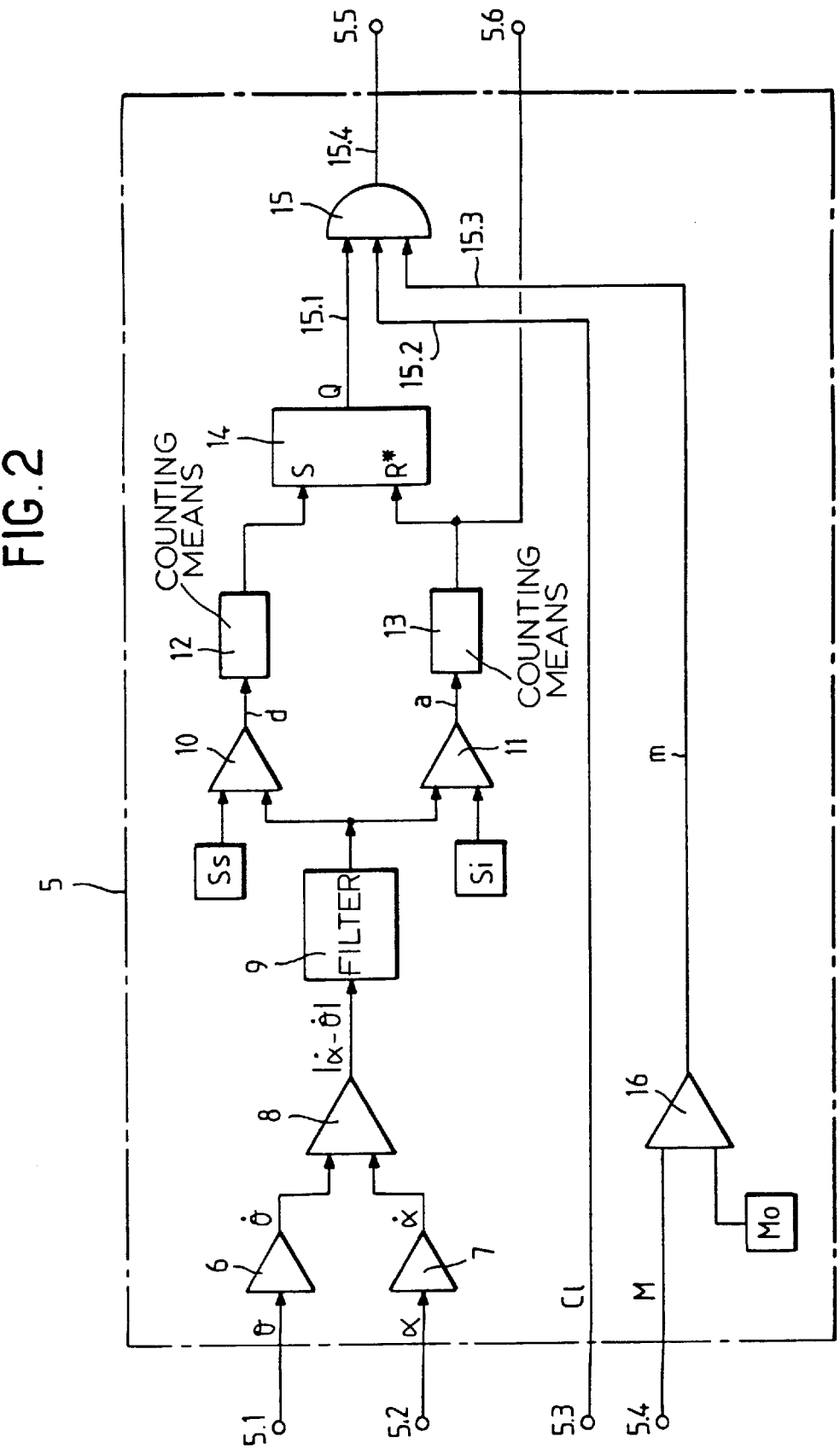
FIG. 2 is the block diagram of one embodiment of the device for detecting vertical gusts of wind, in accordance with the present invention.

FIG. 2 depicts the block diagram of a detector 5 of vertical gusts of wind in accordance with the present invention. This detector 5 is mounted on board the airplane 2 and comprises four inputs 5.1 to 5.4 and two outputs 5.5 and 5.6, the input 5.6 not being necessary for all applications of said detector.

Applied to the inputs 5.1 and 5.2 respectively are the current pitch attitude θ and the current incidence a of the airplane 2. Thanks to the differentiators 6 and 7, the first differentials with respect to time $\dot{\theta}$ and $\dot{\alpha}$ of the current pitch attitude θ and of the current incidence α are obtained. A subtracter 8, to which said differentials are applied works out the difference between them and on its output delivers the absolute value of this difference, namely $|\dot{\alpha}-\dot{\theta}|$. To eliminate measurement noises and avoid false detection of vertical gusts of wind, this absolute value is sent to a filter 9.

On the output of the filter 9, the filtered absolute value $|\dot{\alpha}-\dot{\theta}|$ is sent to two comparators 10 and 11. In the comparator 10, said filtered absolute value is compared with the upper threshold Ss, for example equal to 1°/s, while in the comparator 11, it is compared to a lower threshold Si, for example equal to 0.5°/s.

If, and only if, said filtered absolute value is:
- above the upper threshold Ss, the comparator 10 emits on its output a signal d that vertical gusts of wind have been detected;
- below the lower threshold Si, the comparator 11 emits on its output a signal a that there are no vertical gusts of wind.

Counting means 12 and 13 measure the duration of the signals d and a and send them to a flipflop 14 of the RS* type, if they last for long enough. For example, the signal d is sent to the S input of the flipflop 14, if it lasts at least 200 ms, while the signal a is sent to the R* input of the flipflop 14, if it lasts at least 1 s. The Q output of the flipflop 14 is connected to one of the inputs 15.1 of a gate 15 of the three-input AND type, the output 15.4 of which forms the output 5.5 of the detector 5. The other output 5.6 of said detector is connected to the R* input of said flipflop 14.

Applied to the input 5.3 of the detector 5 is a signal cl, that represents the fact that the airplane 2 is in clean configuration, that is to say that none of its flaps or slats is deployed. The input 5.3 is connected to the input 15.2 of the gate 15.

Incidentally, the input 5.4 of the detector 5 receives the current Mach number M of the airplane 2. This current Mach number M is compared, in a comparator 16, with a Mach number threshold Mo, for example equal to 0.53. The output from the comparator 16 is connected to the input 15.3 of the AND gate and sends a signal m thereto only if the current Mach number M is above the threshold Mo.

The way in which the embodiment of the detector 5 in accordance with the invention and shown in FIG. 2 operates is as follows:

A—Cruising flight without vertical gusts of wind

With the airplane 2 in cruising flight, its configuration is smooth and its Mach number is above Mo. Signals are then applied to the inputs 15.2 and 15.3 of the AND gate.

Incidentally, as there are no vertical gusts of wind, the absolute value $|\dot{\alpha}-\dot{\theta}|$ filtered by the filter 9 is below the threshold Si, which means that the signal d does not exist and that the signal a confirmed in terms of duration by the counting means 13, is applied to the R* input of the flipflop 14 and to the output 5.6 of the detector 5. No signal therefore appears at the Q output of the flipflop 14.

Thus, in this case, there is nothing applied to the input 15.1 of the AND gate 15 and no signal appears at the output 5.5 of the detector 5.

B—Cruising flight as a vertical gust of wind appears

If now a vertical gust of wind appears, the filtered absolute value $|\dot{\alpha}-\dot{\theta}|$ becomes higher than the threshold Ss, which means that the signal d, confirmed in terms of duration by the counting means 12, is applied to the S input of the flipflop 14 and the signal a disappears. The Q output therefore emits an output signal which is sent to the input 15.1 of the gate 15. As the other two inputs 15.2 and 15.3 are receiving signals as described hereinabove, the AND gate becomes active and a signal that a vertical gust of wind is present appears on the output 5.5 of the detector 5.

C—Cruising flight as a vertical oust of wind disappears

If the vertical gust of wind disappears:
- first of all, the filtered absolute value $|\dot{\alpha}-\dot{\theta}|$ drops below the threshold Ss but remains above the threshold Si, which means that the signals d and a are both zero. This means that the Q output remains unchanged and continues to emit its output signal and that the signal that a vertical gust of wind is present therefore continues to be present on the output 5.5 of the detector 5;
- next, the filtered absolute value $|\dot{\alpha}-\dot{\theta}|$ drops below the threshold Si, which means that the signal a appears and is applied to the R* input. The gate 15 therefore does not emit any signal at its Q output and the airplane 2 returns to the condition it was in before the vertical gust of wind occurred.

Figure 3:
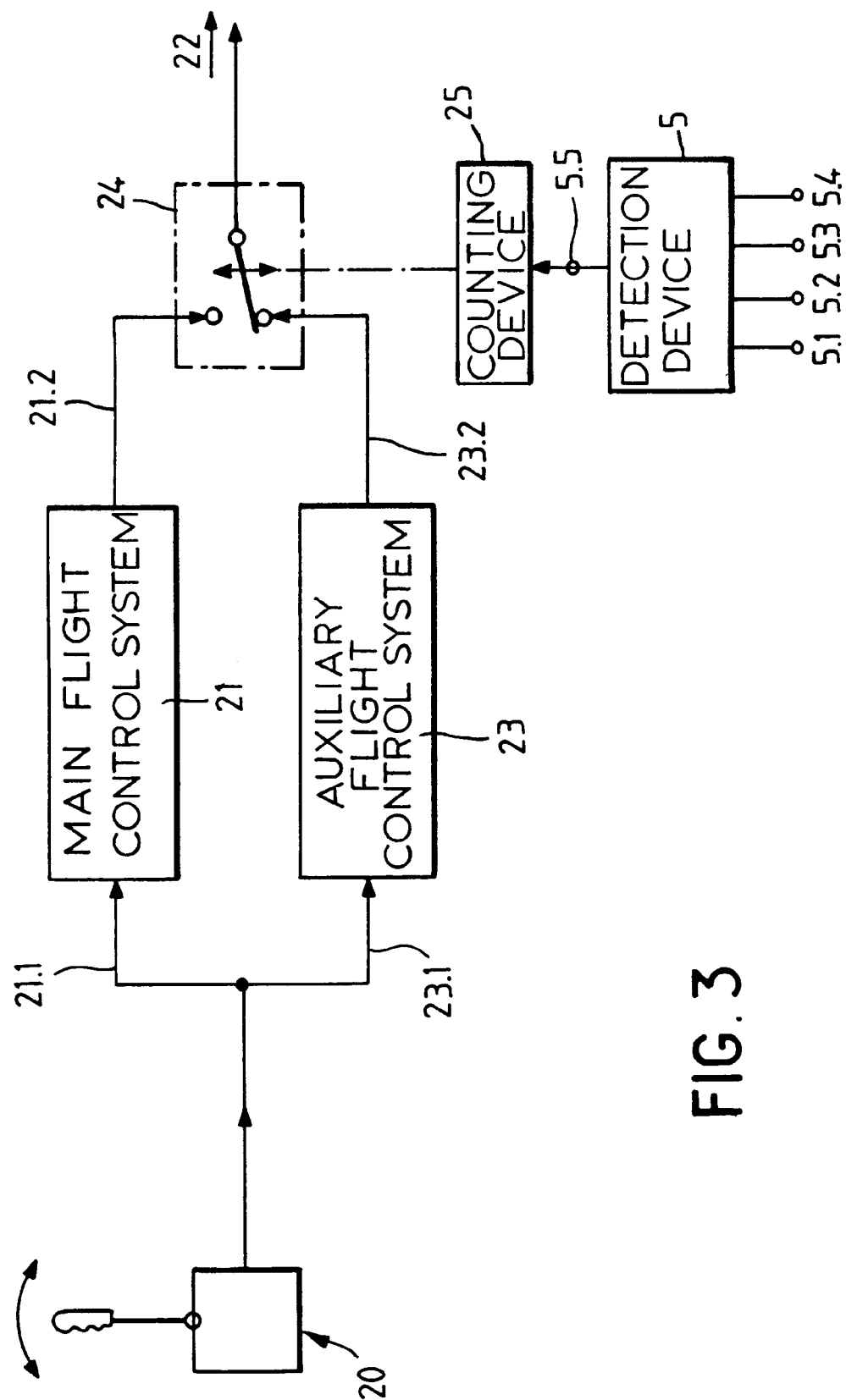
FIG. 3 is the block diagram of one embodiment of the device for pitch-attitude control of an airplane, in accordance with the present invention.

FIG. 3 depicts a device according to the invention for the pitch-attitude control of the aircraft 2. This control device comprises:
- a stick system 20, available to the pilot, for generating pitch-attitude control commands, especially nose-down commands;
- a main flight control system 21 which on its input 21.1 receives said pitch-attitude control commands from said system 20 and generates, on its output 21.2, pitch-attitude control commands for aerodynamic pitch-attitude control surfaces 22 (not depicted in detail);
- an auxiliary flight control system 23 which receives on its input 23.1 (just like the main flight control system 21), said pitch-attitude control commands from said stick system 20 and generates, on its output 23.2, pitch-attitude control commands which are limited, at least as far as commands to nose down are concerned;
- a controlled switch 24, placed between the flight control system 21 and 23 on the one hand, and said aerodynamic surfaces 22 on the other hand, said switch 24 being able to connect to these surfaces either the output 21.2 or the output 23.2;
- the detection device 5 controlling said controlled switch 24 via its output 5.5; and
- a counting device 25 inserted between the detection device 5 and the controlled switch 24.

In the auxiliary flight control system 23, authority to nose down is reduced so that the pilot's action cannot participate in an excessive increase in the load factor applied to the airplane, should a vertical gust of wind be encountered.

As long as the device 5 detects no vertical gust of wind, the aerodynamic pitch-attitude control surfaces 22 are actuated, through the switch 24, by the commands generated by the main system 21 to correspond to the commands that result from operation of the stick system 20, operated by the pilot.

When a vertical gust of wind appears, the detection device 5 flips the switch 24, so that it is now the auxiliary system 23 with limited authority which, under the control of the stick system 20, operates the aerodynamic surfaces 22 to nose down.

If the vertical gust of wind disappears, the detection device 5 flips the switch 24 back, so that the aerodynamic surfaces 22 are again operated by the main system 21.

Because of the counter 25, the above process may, for example, be as follows: when a gust of wind is detected for less than 6 seconds, the auxiliary system 23 is rendered active for at least 10 seconds. If the gust disappears, the main system 21 is made active again, if the gust has disappeared for more than 4 seconds and if the stick 20 has not been used to nose down in at least the last second, in order to avoid any discontinuity in the authority at the stick liable to encourage aircraft pilot coupling.

Of course, the above process is merely one of many examples. In general, the limiting of pitch-attitude control commands generated by the auxiliary flight control system 23 needs to be a compromise between:

- reducing the authority to nose down as far as possible in order to reduce as far as possible the risk of excessive load factors; and
- leaving the pilot with enough authority to nose down to allow him to avoid another airplane in turbulent conditions.

Although the auxiliary flight system 23 has been outlined above as being independent of the main flight system, it goes without saying that it could form a part thereof.

We claim:

1. A method for detecting vertical gusts of wind on board an aircraft in cruising flight, said method comprising the steps of:

calculating an absolute value ($|\dot\alpha-\dot\theta|$) of a difference between a pair of first differentials with respect to time ($\dot\alpha$ and $\dot\theta$) of a current incidence $\alpha$ and a current pitch attitude $\theta$ of said aircraft;

comparing said absolute value to an upper threshold (Ss);

comparing a current Mach number (M) of said aircraft to a Mach number threshold (Mo); and generating an electrical signal that represents presence of a vertical gust of wind when said absolute value is above said upper threshold, when said current Mach number is above said Mach number threshold, and when aerodynamic flaps and slats of said aircraft are in a clean configuration.

2. The method as claimed in claim 1, additionally comprising the step of filtering said absolute value ($|\dot\alpha-\dot\theta|$).

3. The method as claimed in claim 1, wherein said upper threshold (Ss) is at least approximately equal to 1°/s.

4. The method as claimed in claim 1, wherein said generating step is subordinated when said absolute value is above said upper threshold for at least a first determined duration.

5. The method as claimed in claim 1, additionally comprising the step of comparing said absolute value ($|\dot\alpha-\dot\theta|$) to a threshold (Si) below said upper threshold (Ss).

6. The method as claimed in claim 5, wherein when said absolute value changes from a value above to a value below said upper threshold (Ss), said electrical signal is sustained until said absolute value drops below said lower threshold (Si) so long as said current Mach number is above said Mach number threshold and said aerodynamic flaps and said slats of said aircraft are in said clean configuration.

7. The method as claimed in claim 5, wherein said lower threshold (Si) is at least approximately equal to 0.5°/s.

8. The method as claimed in claim 6, wherein said sustaining of said electrical signal is subordinated when said absolute value is below said lower threshold for at least a second predetermined duration.

9. A device for detecting a vertical gust of wind on board an aircraft in cruising flight, said device comprising:

subtracting means (8) receiving a first differential ($\dot\alpha$) with respect to time of a current incidence ($\alpha$) and a first differential ($\dot\theta$) with respect to time of a current pitch attitude ($\theta$) and delivering on an output an absolute value ($|\dot\alpha-\dot\theta|$) of a difference between said differentials;

first comparison means (10) for comparing said absolute value with an upper threshold (Ss) and for delivering a signal (d) if said absolute value is above said upper threshold (Ss);

second comparison means (16) for comparing a current Mach number (M) of said aircraft with a Mach number threshold (Mo) and for delivering a signal (m) if said current Mach number is above said Mach number threshold; and first logic means (15) of the AND type receiving on a first input a signal (d) resulting from comparison of said absolute value with said upper threshold, receiving on a second input a signal (m) resulting from comparison of said current Mach number with said Mach number threshold (Mo), and receiving on a third input a signal (c1) indicating that aerodynamic flaps and slats of said aircraft are in a clean configuration, said first logic means (15) delivering on an output (15.4) a signal that represents presence of a vertical gust of wind.

10. The detection device as claimed in claim 9, additionally comprising differentiating means (6, 7) that receives signals that represent a current pitch attitude ($\theta$) and a current incidence ($\alpha$) and delivers on an output first differentials of said current pitch attitude $\theta$ and said current incidence $\alpha$.

11. The detection device as claimed in claim 9, additionally comprising third comparison means (11) for comparing said absolute value with a threshold (Si) below said upper threshold (Ss) and for delivering a signal if said absolute value is below said lower threshold (Si); and second logic means (14) inserted between said first comparison means (10) and said first logic means (15), said second logic means (14) receiving on inputs said signals (d) and (a) resulting from said comparisons of said absolute value with said thresholds and delivering to said second logic means (15):

either no signal, if said signal (a) resulting from said comparison of said absolute value with said lower threshold exists; or said signal (d) resulting from said comparison of said absolute value with said upper threshold, as long as said absolute value ($|\dot\alpha-\dot\theta|$) is above said lower threshold (Si).

12. A device for controlling the pitch attitude of an aircraft, comprising a stick system (20) available to the pilot and a pitch-attitude flight control system (21) receiving pitch-attitude control commands from said stick system (20) and generating the pitch-attitude control commands for the aerodynamic pitch-attitude control surfaces (22), said device comprising:

an auxiliary flight-control system (23) receiving said pitch-attitude control commands from said stick system (20) and generating pitch-attitude control commands which are limited at least as far as commands to nose-down are concerned;

a controlled switch (24) located between said control systems (21, 23) and said aerodynamic pitch-attitude control surfaces (22) and which can send to said control surfaces either the pitch-attitude control commands from said flight-control system (21) or the pitch-attitude control commands from said auxiliary flight-control system (23); and a device (5) for detecting a vertical gust of wind controlling said controlled switch (24) so that said limited pitch-attitude control commands are sent to said aerodynamic surfaces during said vertical gust of wind.

13. The control device as claimed in claim 12, wherein said device (5) comprises:

subtracting means (8) receiving a first differential ($\dot{\alpha}$) with respect to time of a current incidence ($\alpha$) and a first differential ($\dot{\theta}$) with respect to time of a current pitch attitude ($\theta$) and delivering on an output an absolute value ($|\dot{\alpha}-\dot{\theta}|$) of a difference between said differentials;

first comparison means (10) for comparing said absolute value with an upper threshold (Ss) and for delivering a signal (d) if said absolute value is above said upper threshold (Ss);

second comparison means (16) for comparing a current Mach number (M) of said aircraft with a Mach number threshold (Mo) and for delivering a signal (m) if said current Mach number is above said Mach number threshold; and first logic means (15) of the AND type receiving on a first input a signal (d) resulting from comparison of said absolute value with said upper threshold, receiving on a second input a signal (m) resulting from comparison of said current Mach number with said Mach number threshold (Mo), and receiving on a third input a signal (c1) indicating that aerodynamic flaps and slats of said aircraft are in a clean configuration, said first logic means (15) delivering on an output (15.4) a signal that represents presence of a vertical gust of wind.

* * * * *